US007633776B2

(12) United States Patent
Usui

(10) Patent No.: US 7,633,776 B2
(45) Date of Patent: Dec. 15, 2009

(54) DC-DC CONVERTER FOR OVERVOLTAGE PROTECTION

(75) Inventor: Hiroshi Usui, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 264 days.

(21) Appl. No.: 11/638,086

(22) Filed: Dec. 13, 2006

(65) Prior Publication Data

US 2007/0133236 A1      Jun. 14, 2007

(30) Foreign Application Priority Data

Dec. 14, 2005      (JP)      ............................. 2005-360853

(51) Int. Cl.
      *H02H 7/122* (2006.01)
(52) U.S. Cl. .................. 363/56.11; 363/21.16; 361/91.6
(58) Field of Classification Search .............. 363/56.11, 363/21.16, 56.05, 56.08, 21.08; 361/91.6, 361/18
      See application file for complete search history.

(56) References Cited

U.S. PATENT DOCUMENTS 5,818,669 A * 10/1998 Mader ......................... 361/18

5,872,704 A * 2/1999 Kim ............................ 363/20
6,023,178 A * 2/2000 Shioya et al. ............... 327/176
6,160,386 A * 12/2000 Hemena et al. ............. 323/272

FOREIGN PATENT DOCUMENTS

JP      6090561      3/1994
JP      9265328      10/1997

* cited by examiner

*Primary Examiner*—Adolf Berhane
*Assistant Examiner*—Harry Behm
(74) *Attorney, Agent, or Firm*—Bachman & LaPointe, P.C.

(57) ABSTRACT

A DC-DC converter for overvoltage protection is provided with a primary control circuit 12 which comprises an impedance controller 31 and a protective circuit 41 for ceasing operation of primary control circuit 12 when power source voltage $V_{CC}$ on primary control circuit 12 exceeds a predetermined voltage level. Impedance controller 31 comprises a potential detector 32 for picking out power source voltage $V_{CC}$ to primary control circuit 12 to produce a detection signal; and an impedance adjuster 33 for adjusting power input impedance Z in primary control circuit 12 in response to the detection signal from potential detector 32 to repress rapid rise in power source voltage on primary control circuit 12.

14 Claims, 4 Drawing Sheets

(A)　　　　　　　(B)

(A)

(B)

(A)

(B)

DC-DC CONVERTER FOR OVERVOLTAGE PROTECTION

TECHNICAL FIELD

This invention relates to a DC-DC converter for protecting a built-in control circuit from overvoltage.

BACKGROUND OF THE INVENTION

Prior art DC-DC converters, known and widely used as inexpensive DC power sources of the simple structure, utilize a switching element turned on and off to intermittently supply DC voltage from DC power source to a transformer which then converts DC voltage into a high frequency power to supply stabilized DC power to an electric load through a rectifying smoother. A prior art DC-DC converter exemplified in FIG. 6 comprises a primary winding 2a of a transformer 2 and a MOS-FET 3 as a switching element connected in series to a DC power source 1; a main rectifying smoother 4 which comprises a main rectifying diode 5 and a main smoothing capacitor 6 connected to a secondary winding 2b of transformer 2; an auxiliary rectifying smoother 7 which comprises an auxiliary rectifying diode 8 and an auxiliary smoothing capacitor 9 connected to a drive winding 2c of transformer 2; an output voltage detector 10 for detecting DC output voltage $V_O$ from main rectifying smoother 4; a current detecting resistor 16 for discerning winding current ID flowing through the primary closed circuit of transformer 2 in the form of detection voltage $V_{OCP}$; and a primary control circuit 12 for producing drive signals $V_G$ to turn MOS-FET 3 on and off in response to detection signals transmitted through a photo-coupler 11 from output voltage detector 10 and detection voltage $V_{OCP}$ from current detecting resistor 16. Primary and secondary windings 2a and 2b of transformer 2 are coupled with the adverse polarity from each other. DC-DC converter shown in FIG. 6 is operated to cause primary control circuit 12 to produce drive signals to MOS-FET 3 which thereby is turned on and off so that the converter produces DC output voltage $V_O$ to electric load from secondary winding 2b of transformer 2 through main rectifying smoother 4 and DC output terminals 13 and 14, while drive winding 2c of transformer 2 provides power source voltage $V_{CC}$ to primary control circuit 12 through auxiliary rectifying smoother 7.

Primary control circuit 12 comprises a normal power supply 17 for generating a reference voltage $V_{E1}$; a resistor 18 which has one end connected to normal power supply 17 and the other end connected to a light receiver 16 of a photo-coupler 11; a comparator 19 for comparing detection voltage $V_{OSP}$ simultaneously applied on current detecting resistor 16 and non-inverted terminal+of comparator 19 with regulatory voltage $V_M$ simultaneously applied on a junction of resistor 18 and light receiver 11b of photo-coupler 11 and on inverted terminal −of comparator 19; an oscillator 20 for generating pulse signals of constant frequency; and a RS flip flop (RSFF) 21 which is set by a pulse signal at set terminal S from oscillator 20 and reset by an output signal at reset terminal R from comparator 19 for producing drive signals $V_G$ to a gate terminal of MOS-FET 3. Upon start-up of the converter, electric current flows from DC power source 1 through a trigger resistor 15 to auxiliary capacitor 9 to electrically charge capacitor 9 and then the converter commences the operation when capacitor 9 is charged to a given operating voltage level for primary control circuit 12 which is thereafter activated by drive power $V_{CC}$ supplied from drive winding 2c of transformer 2 through auxiliary rectifying smoother 7.

In triggering operation of prior art DC-DC converter shown in FIG. 6, a main switch not shown is turned on to send an electric current from DC power source 1 of DC voltage E through trigger resistor 15 to auxiliary capacitor 9 of auxiliary rectifying smoother 7 and electrically charge auxiliary capacitor 9. When charged voltage in capacitor 9 comes to operating voltage for primary control circuit 12, power source voltage $V_{CC}$ is applied on all elements 19 to 21 in primary control circuit 12 to cause primary control circuit 12 to start the operation. Once started, oscillator 20 produces pulse signals of a constant frequency to set terminal S of RSFF 21 which is then set to generate a drive signal $V_G$ of high voltage level from output terminal Q of RSFF 21 to gate terminal of MOS-FET 3 to turn MOS-FET 3 on.

When MOS-FET 3 is turned on, winding current $I_D$ flows from DC power source 1 through the primary closed circuit including primary winding 2a of transformer 2, MOS-FET 3 and current detecting resistor 16 to DC power source 1 to accumulate energy in transformer 2. Current detecting resistor 16 converts winding current $I_D$ therethrough into a detection voltage $V_{OCP}$ corresponding to winding current $I_D$. Detection voltage $V_{OCP}$ on current detecting resistor 16 is also applied on non-inverted input terminal of comparator 19 which compares detection voltage $V_{OCP}$ with regulatory voltage $V_M$ at inverted input terminal−of comparator 19 connected to a junction of resistor 18 and light receiver 11b of photo-coupler 11. When detection voltage $V_{OCP}$ on current detection resistor 16 reaches regulatory voltage $V_M$ on junction of resistor 18 and light receiver 11b, comparator 19 delivers an output signal of high voltage level to reset terminal R of RSFF 21 to reset RSFF 21. Thus, RSFF 21 develops a drive signal $V_G$ of low voltage level from Q output terminal to gate terminal of MOS-FET 3 to turn MOS-FET 3 off.

When MOS-FET 3 is switched off, energy accumulated in transformer 2 is released from secondary winding 2b of transformer 2 by producing output current from secondary winding 2b through main rectifying diode 5 and main smoothing capacitor 6 of main rectifying smoother 4 to supply DC power to electric load from DC output terminals 13 and 14 under DC voltage $V_O$. At the same time, energy stored in transformer 2 is also discharged from drive winding 2c of transformer 2 through auxiliary rectifying diode 8 and auxiliary smoothing capacitor 9 of auxiliary rectifying smoother 7 to apply power source voltage $V_{CC}$ on primary control circuit 12. DC output voltage $V_O$ between DC output terminals 13 and 14 is compared with a reference voltage not shown in output voltage detector 10 which produces an error signal, the potential difference between DC output voltage $V_O$ and reference voltage so that error signal is transformed into optical light output by light emitter 11a of photo-coupler 11 and transmitted to light receiver 11b. Accordingly, light receiver 11b allows electric current of the amount corresponding to magnitude of error signal to flow through light receiver 11b and thereby provide regulatory voltage $V_M$ on junction of resistor 18 and light receiver 11b of photo-coupler 11. Consequently, under the heavier load, DC output voltage $V_O$ becomes lower to cause a smaller amount of electric current to flow through light emitter and receiver 11a and 11b, elevate regulatory voltage $V_M$, extend pulse width of drive signals $V_G$ from RSFF 21 to gate terminal of MOS-FET 3, and thereby widen the on-period of MOS-FET 3. Adversely under the lighter load, DC output voltage $V_O$ becomes higher to cause a larger amount of electric current to flow through light emitter and receiver 11a and 11b, diminish regulatory voltage $V_M$, narrow pulse width of drive signals $V_G$ from RSFF 21 to gate terminal of MOS-FET 3, and thereby shorten the on-period of MOS-FET 3. Specifically, under the heavier load, output voltage detector 10 produces decreased error signal to boost regulatory voltage $V_M$ so that comparator 19 produces reset signals at a late stage to RSFF 21 to extend the on-period of MOS-FET 3. To the contrary, under the lighter load, output voltage detector 10 produces increased error signal to lessen regulatory voltage $V_M$ so that comparator 19 produces reset signals at an early stage to RSFF 21 to shorten the on-period of MOS-FET 3. In this way, the on-period of MOS-FET 3 can appropriately be adjusted to control winding current $I_D$ passing through the primary closed circuit of transformer 2. The foregoing operation is repeated to moderate, to a desired voltage level, DC output voltage $V_O$ applied from DC output terminals 13 and 14 to load.

As understood from the circuit, heavy load causes winding current $I_D$ through MOS-FET 3 to increase, and current detecting resistor 16 picks out winding current $I_D$ through MOS-FET 3 as a detection voltage $V_{OCP}$ corresponding to winding current $I_D$. In this case, when detection voltage $V_{OCP}$ reaches or exceeds reference voltage $V_{E1}$ of normal power source 17, primary control circuit 12 comes to the overcurrent condition, and winding current $I_D$ can never increase any more. Under this excessive current condition, a maximum amount of winding current $I_D$ flows through MOS-FET 3. In this way, as a large amount of winding current $I_D$ passes through MOS-FET 3 under the overcurrent or heavy load condition, precipitous pulsatile surge voltages occur on primary, secondary and drive windings 2a, 2b and 2c of transformer 2.

In response to recent overwhelming requirement to reduced consumption power in DC-DC converters during the standby time, most of primary control circuits 12 involve generally very low power-consumptive CMOS (complementary metal oxide semiconductor) circuits of very high input impedance. When winding current $I_D$ becomes an overcurrent, it results in a surge voltage appearing on drive winding 2c of transformer 2 so that higher and steeply rising power source voltage $V_{CC}$ would be applied from drive winding 2c through auxiliary rectifying smoother 7 to primary control circuit 12, in particular, if primary control circuit 12 is assembled with CMOS circuits. In this case, however, there is a risk that power source voltage $V_{CC}$ may rise and exceed an withstand voltage of primary control circuit 12, and for that reason, prior art DC-DC converter exemplified in FIG. 6 comprises a Zener diode 22 connected in parallel to auxiliary rectifying smoother 7 for absorbing surge energy to prevent abnormal boost in power source voltage $V_{CC}$. When a surge of extremely large energy occurs in power source voltage $V_{CC}$, Zener diode 22 cannot sufficiently absorb such a surge and may bring primary control circuit 12 into breakdown. In another aspect, Zener diode 22 unfavorably clamps power source voltage $V_{CC}$ for primary control circuit 12 at the Zener or breakdown voltage, preventing exact detection of excessive voltage in the primary side of DC-DC converter.

To solve the foregoing problems, for example, Japanese Patent Disclosure No. 6-90561 published Mar. 29, 1994, shows a power source device which comprises an overvoltage protector connected to output terminals of a drive winding in a transformer to provide source power from drive winding to a control circuit. The overvoltage protector comprises a capacitor connected in parallel to drive winding, and a series circuit of a Zener diode and a resistor connected in parallel to drive winding to clamp emergent overvoltage below operation voltage for control circuit by the overvoltage protector. Also, Japanese Patent Disclosure No. 9-265328 published Oct. 7, 1997, exhibits an active dummy circuit which comprises an error amplifier connected to a secondary winding of a transformer to produce an error signal when output voltage from secondary winding exceeds a reference voltage, and a dummy loading circuit turned on by the error signal from error amplifier to pass a dummy current through dummy loading circuit for absorbing a part of overvoltage in transformer. If an operation continues to repress overvoltage for a long time in either of the circuits disclosed in these references, overvoltage protector and dummy loading circuit disadvantageously increase consumed electric power, giving rise to an associated excessive temperature rise which may cause damage to elements or circuits. Accordingly, alleviation of effect by such heating in circuits needs increased thermal capacity which disadvantageously requires a larger size or expensive converter.

An object of the present invention is to provide a DC-DC converter capable of detecting overvoltage resulted from surge voltage in a primary side to repress rapid rise in power source voltage for a control circuit. Another object of the present invention is to provide a DC-DC converter which can inhibit power loss during the protection against overvoltage.

SUMMARY OF THE INVENTION

The DC-DC converter according to the present invention comprises a primary winding (2a) of a transformer (2) and at least one switching element (3) connected in series to a DC power source (1); a main rectifying smoother (4) connected to a secondary winding (2b) or primary winding (2a) of transformer (2); a primary control circuit (12) for producing drive signals to turn switching element (3) on and off to produce DC output of a controlled given level through main rectifying smoother (4); and a drive winding (2c) provided in transformer (2) for providing drive power for primary control circuit (12) through an auxiliary rectifying smoother (7) connected between drive winding (2c) and primary control circuit (12). Primary control circuit (12) comprises an impedance controller (31) and a protective circuit (41) for ceasing operation of primary control circuit (12) when power source voltage ($V_{CC}$) on primary control circuit (12) exceeds a predetermined voltage level. Impedance controller (31) comprises a potential detector (32) for picking out power source voltage ($V_{CC}$) to primary control circuit (12) to produce a detection signal; and an impedance adjuster (33) for adjusting power input impedance (Z) in primary control circuit (12) in response to the detection signal from potential detector (32).

When a surge voltage appears on any one of primary, secondary and drive windings (2a, 2b and 2c) of transformer (2) under the heavy load condition, rapidly rising power source voltage ($V_{CC}$) is applied from drive winding (2c) through auxiliary rectifying smoother (7) to primary control circuit (12). At this moment, potential detector (32) picks out surge voltage in power source voltage ($V_{CC}$) on primary control circuit (12) to produce a detection signal which activates impedance adjuster (33) to reduce input impedance in primary control circuit (12), thereby repressing rapid rise in power source voltage ($V_{CC}$) by surge voltage on primary control circuit (12). Even though impedance controller (31) is activated to reduce power input impedance (Z) in primary control circuit (12) due to surge voltage, predetermined residual impedance in primary control circuit (12) increases power source voltage ($V_{CC}$) applied on primary control circuit (12) during occurrence of overvoltage. In this way, potential detector (32) can accurately detect overvoltage in power source voltage ($V_{CC}$) applied on primary control circuit (12) in the primary side to prevent malfunction of protective circuit (41) by surge voltage. In addition, when power source voltage ($V_{CC}$) exceeds a predetermined level upon occurrence of excessive voltage, protective circuit (41) ceases operation of primary control circuit (12) to extremely reduce power loss incurred for protection against overvoltage on DC-DC converter and primary control circuit (12).

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Embodiments of the DC-DC converter for overvoltage protection according to the present invention will be described hereinafter in connection with FIGS. 1 to 5 of the drawings. Same reference symbols as those shown in FIG. 6 are applied to similar portions in these drawings, omitting explanation therefor.

Figure 1:
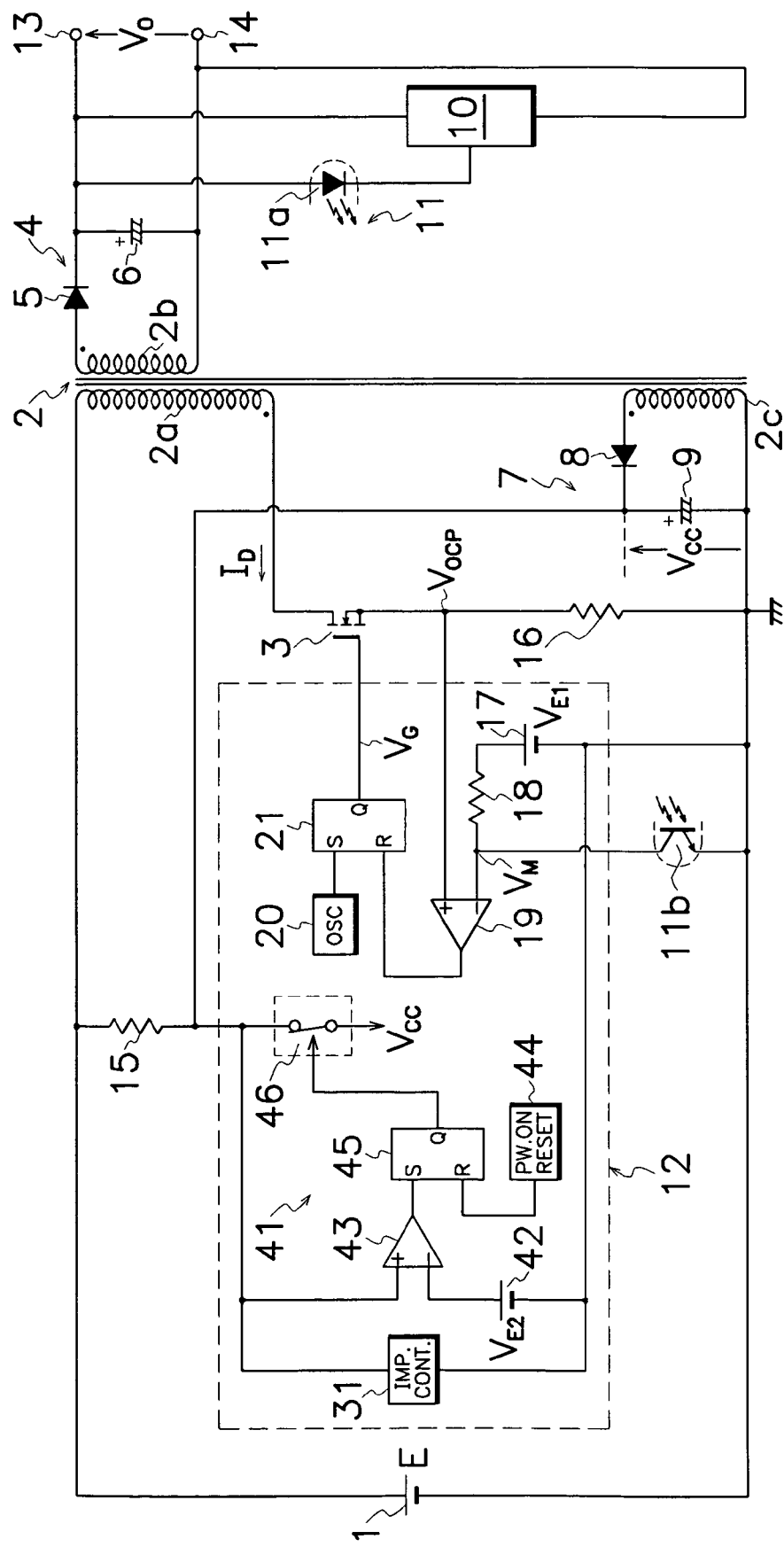
FIG. 1 is a circuit diagram showing an embodiment of a DC-DC converter according to the present invention.
Figure 6:
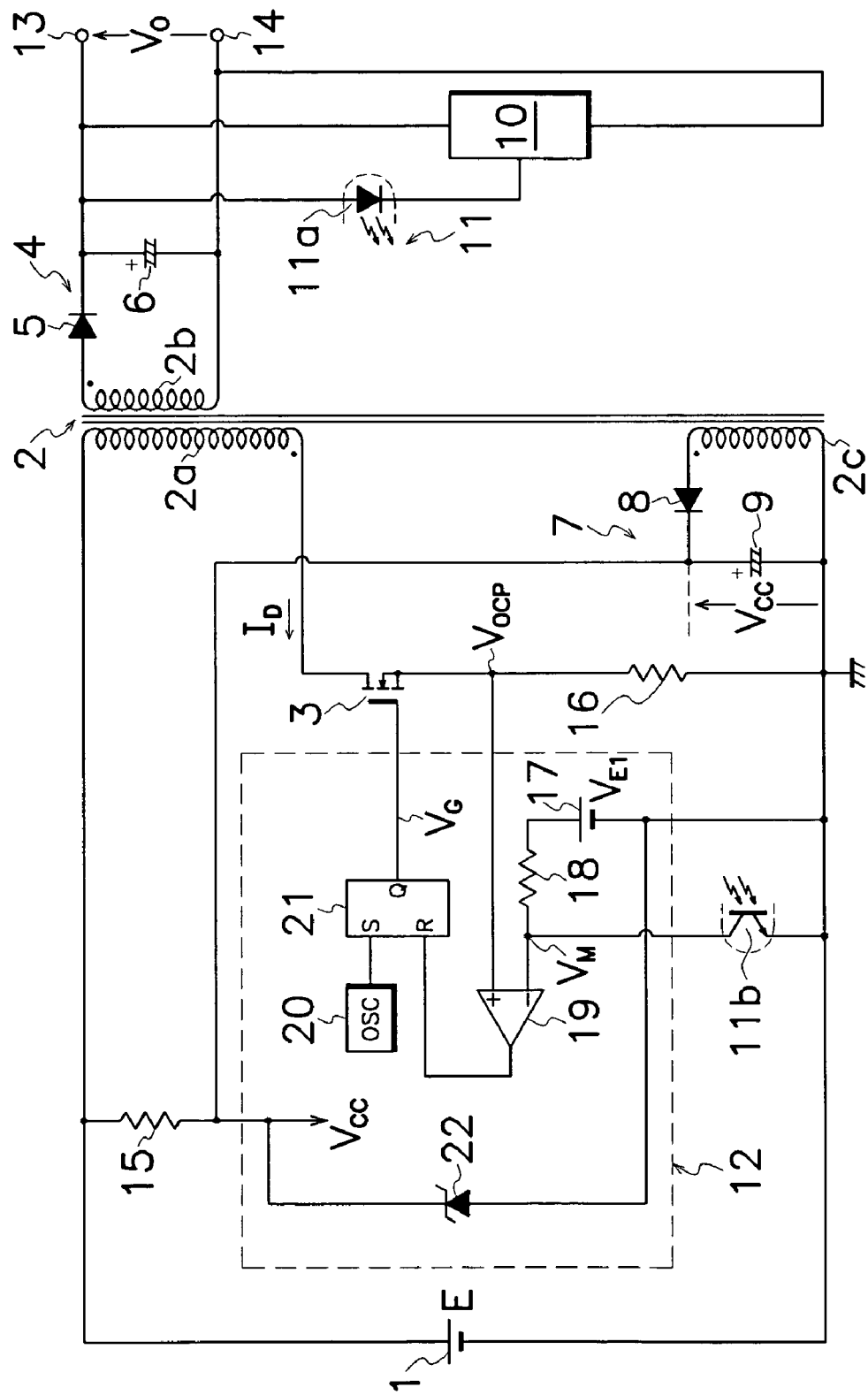
FIG. 6 is a circuit diagram of a prior art DC-DC converter.

As shown in FIG. 1, the DC-DC converter of an embodiment according to the present invention, involves a primary control circuit 12 which comprises an impedance controller 31 and a protective circuit 41 for ceasing operation of primary control circuit 12 when power source voltage $V_{CC}$ of primary control circuit 12 exceeds a predetermined voltage level but without Zener diode 22 shown in FIG. 6.

Figure 2:
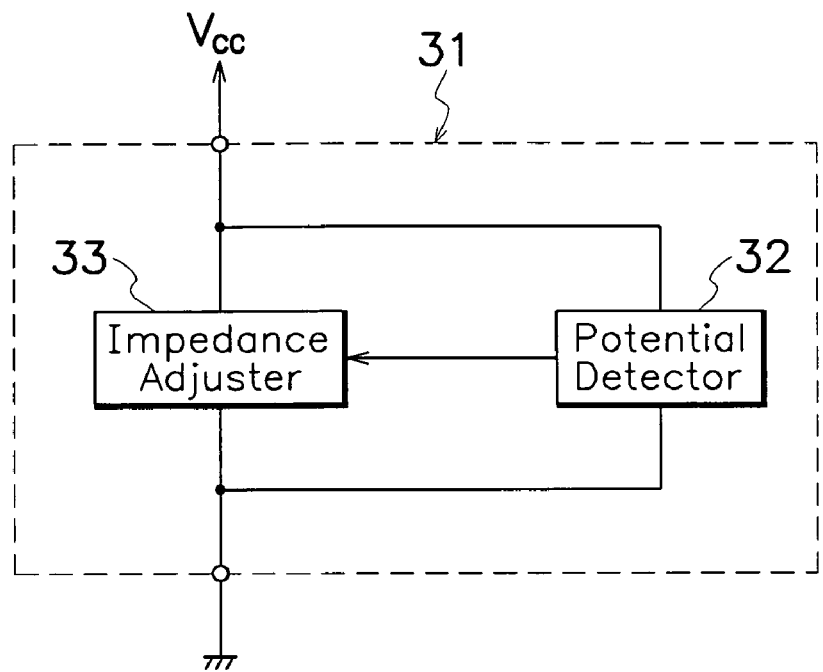
FIG. 2 is a circuit block diagram showing a configuration of an impedance controller in the embodiment.
Figure 3:
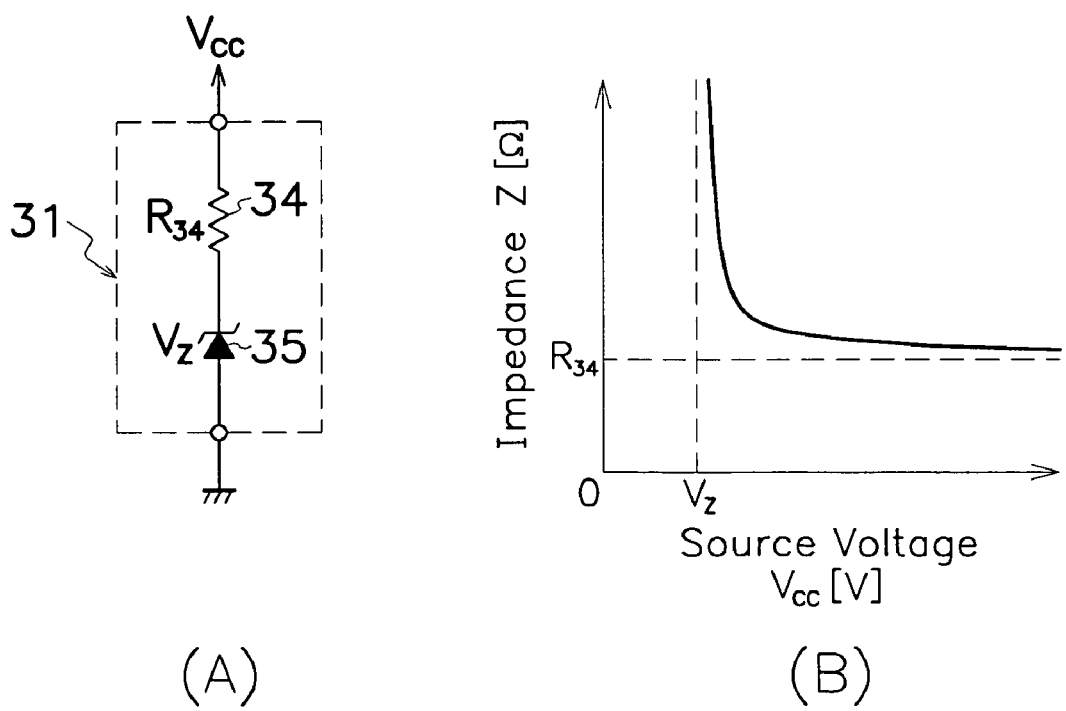
FIG. 3 illustrates a circuit diagram of a first embodiment of the impedance controller and its impedance property with variation in power source voltage.

As illustrated in FIG. 2, impedance controller 31 comprises a potential detector 32 for picking out power source voltage $V_{CC}$ to primary control circuit 12 to produce a detection signal; and an impedance adjuster 33 for regulating power input impedance in primary control circuit 12 by detection signal from potential detector 32. For example as shown in FIG. 3(A), impedance controller 31 actually comprises a resistor 34 as an impedance element of resistance or impedance value $R_{34}$, and a Zener diode 35 as a constant voltage element connected in series to resistor 34 for conversion into a breakdown when breakdown voltage $V_Z$ is surpassed by voltage applied across anode-cathode terminals of Zener diode 35 from auxiliary rectifying smoother 7. Impedance controller 31 indicates its impedance property shown in FIG. 3(B) with variation in power source voltage $V_{CC}$ on primary control circuit 12.

As shown in FIG. 1, a protective circuit 41 comprises a comparator 43 for comparing output voltage $V_{CC}$ from auxiliary rectifying smoother 7 with a reference voltage $V_{E2}$ of a normal power supply 42 to produce an output signal when output voltage $V_{CC}$ from auxiliary rectifying smoother 7 exceeds reference voltage $V_{E2}$; a power-on-reset circuit 44 for generating a reset signal of high voltage level on start-up of primary control circuit 12; an RS flip flop (RSFF) 45 as a retention circuit for producing and maintaining output signal of high voltage level from Q output terminal when it receives at set terminal S output signal of high voltage level from comparator 43 and for switching output signal from Q output terminal into and maintaining low voltage level when it receives at reset terminal R output signal of high voltage level from power-on-reset circuit 44; and a switch 46 as a supply controller usually kept in the on condition and turned off when it receives output signal of high voltage level from RSFF 45 to cease supply of power source voltage $V_{CC}$ to elements 19 to 21, 31, 43 to 45 in primary control circuit 12. In other words, RSFF 45 serves as the retention circuit for maintaining output signal of high voltage level from comparator 43 until output voltage $V_{CC}$ from auxiliary rectifying smoother 7 decreases below a level of the retained voltage of RSFF 45. Other configurations are the substantially similar to those in prior art DC-DC converter shown in FIG. 6.

When a surge voltage arises on any one of primary, secondary and drive windings 2a, 2b and 2c of transformer 2 due to heavier electric load connected to DC output terminals 13 and 14, steeply increasing power source voltage $V_{CC}$ is applied from drive winding 2c through auxiliary rectifying smoother 7 to primary control circuit 12. When power source voltage $V_{CC}$ on primary control circuit 12 increases so that breakdown voltage $V_Z$ is surpassed by voltage between cathode and anode terminals of Zener diode 35 in impedance control circuit 31, Zener diode 35 comes to breakdown to cause electric current to start flowing through resistor 34 and Zener diode 35. Accordingly, as shown in FIG. 3(B), impedance between two terminals of impedance control circuit 31 abruptly drops from nearly infinity and converges toward resistance value $R_{34}$ of resistor 34 with increased power source voltage $V_{CC}$ to thereby reduce input impedance of primary control circuit 12. Thus, voltage boost by surge voltage can be lowered in power source voltage $V_{CC}$ from auxiliary rectifying smoother 7, while suppressing rapid rise in power source voltage $V_{CC}$ applied on primary control circuit 12.

Even though impedance controller 31 is activated to reduce input impedance in primary control circuit 12 due to surge voltage developed on each winding 2a, 2b and 2c of transformer 2, predetermined residual impedance by resistor 34 of resistance $R_{34}$ increases power source voltage $V_{CC}$ applied on primary control circuit 12 during occurrence of overvoltage. Consequently, potential detector 32 can accurately detect, in the primary side, overvoltage in power source voltage $V_{CC}$ applied on primary control circuit. 12 to prevent malfunction of protective circuit 41 by surge voltage.

In addition, when power source voltage $V_{CC}$ applied on primary control circuit 12 exceeds a predetermined reference level $V_{E2}$ of normal power supply 42 in protective circuit 41 upon occurrence of excessive voltage, comparator 43 produces an output signal of high voltage level to set RSFF 45 which thereby retains its output signal in high voltage level. Therefore, RSFF 45 supplies output signal of high voltage level for switch 46 of protective circuit 41 to turn switch 46 off and cease supply of power source voltage $V_{CC}$ to electric elements 19 to 21, 31 and 43 to 45 in primary control circuit 12. RSFF 45 maintains output signal of high voltage level, until power output voltage $V_{CC}$ from auxiliary rectifying smoother 7 decreases below a level of the retained voltage by RSFF 45. Accordingly, once a main power switch not shown is turned off after detection of overvoltage to cease application of DC voltage E from DC power source 1 on primary control circuit 12, main power switch is again turned on to make power-on-reset circuit 44 produce a reset signal of high voltage level which resets RSFF 45, and therefore, RSFF 45 produces output signal of low voltage level to turn switch 46 on. In this way, switch 46 is kept off until main power switch is turned off after detection of excessive voltage to minimize power loss produced during the overvoltage protection since no supply of power source voltage $V_{CC}$ is applied on primary control circuit 12. Basic operations of DC-DC converter shown in FIG. 1 are substantially the same as those in DC-DC converter shown in FIG. 6 except the foregoing repressive operation of surge voltage and protective operation of excessive voltage.

Moreover, the present embodiment stops power supply to primary control circuit 12 to minimize power loss incurred during protection of DC-DC converter and primary control circuit 12 against overvoltage, and therefore, DC-DC converter can have electric modules of less temperature rise by associated heating during operation and an integrated structure of a semiconductor device such as monolithic or hybrid ICs wherein primary control circuit 12, impedance control circuit 31 and protective circuit 41 against overvoltage are mounted on a same single semiconductor substrate or wafer.

Figure 4:
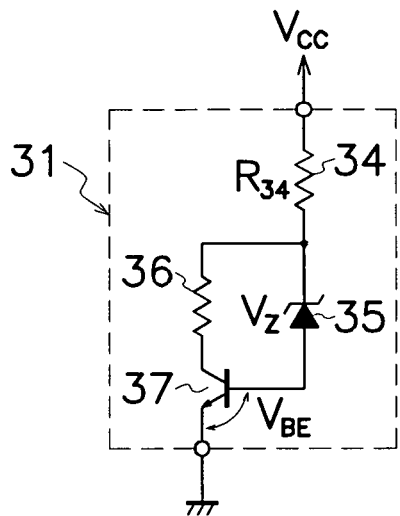
FIG. 4 illustrates a circuit diagram of a second embodiment of the impedance controller and its impedance property with variation in power source voltage.
Figure 4:
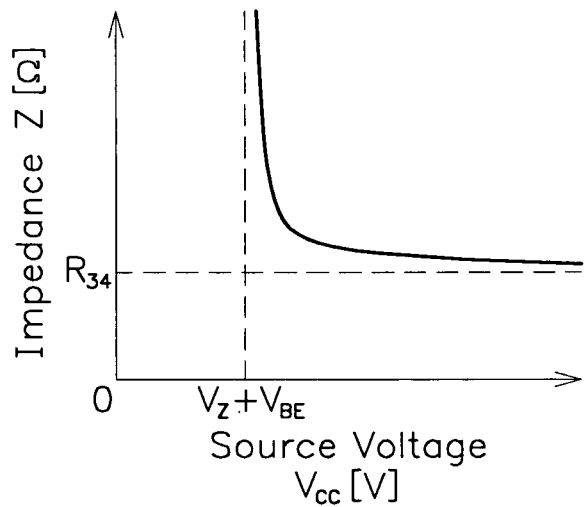

The foregoing embodiment may be modified in various modes. For example, impedance control circuit 31 of FIG. 3 may be altered into circuit structures shown in FIG. 4 or 5. FIG. 4(A) illustrates an impedance control circuit 31 which comprises a first resistor 34 having one end connected to power source input terminal of primary control circuit 12; a Zener diode 35 having a cathode terminal connected to the other end of first resistor 34; a second resistor 36 having one end connected between the other end of first resistor 34 and cathode terminal of Zener diode 35; and a transistor 37 having a collector terminal connected to the other end of second resistor 36, an emitter terminal connected to ground and a base terminal connected to an anode terminal of Zener diode 35. Assuming that symbols $V_{BE}$, $V_Z$ and $R_{34}$ represent respectively voltage between base and emitter terminals of transistor 37, breakdown voltage of Zener diode 35, and resistance of resistor 34, impedance control circuit 31 indicates the impedance property shown in FIG. 4(B) relative to variation in power source voltage $V_{CC}$ on primary control circuit 12. In operation, when power source voltage $V_{CC}$ on primary control circuit 12 exceeds the sum voltage ($V_Z+V_{BE}$) of breakdown voltage $V_Z$ of Zener diode 35 and voltage $V_{BE}$ between base and emitter terminals of transistor 37, Zener diode 35 comes to a breakdown to cause electric current to flow through resistor 34, Zener diode 35, and base and emitter terminals of transistor 37, turning transistor 37 on. Accordingly, since cathode voltage of Zener diode 35 reaches essentially constant voltage level of ($V_Z+V_{BE}$), power input impedance Z between both ends of impedance control circuit 31 sharply drops from nearly infinity and converges toward resistance $R_{34}$ of resistor 34 with increased power source voltage $V_{CC}$. Second resistor 36 shown in FIG. 4(A) serves to reduce voltage between collector and emitter terminals of transistor 37 by voltage drop through second resistor 36 to control or diminish power consumed in transistor 37, and second resistor 36 may be omitted from impedance control circuit 31.

Figure 5:
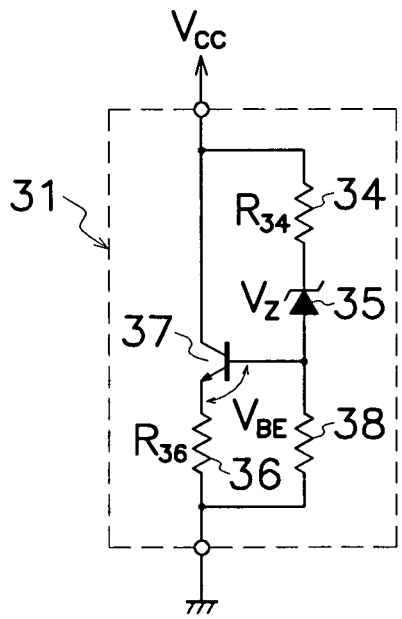
FIG. 5 illustrates a circuit diagram of a third embodiment of the impedance controller and its impedance property with variation in power source voltage.
Figure 5:
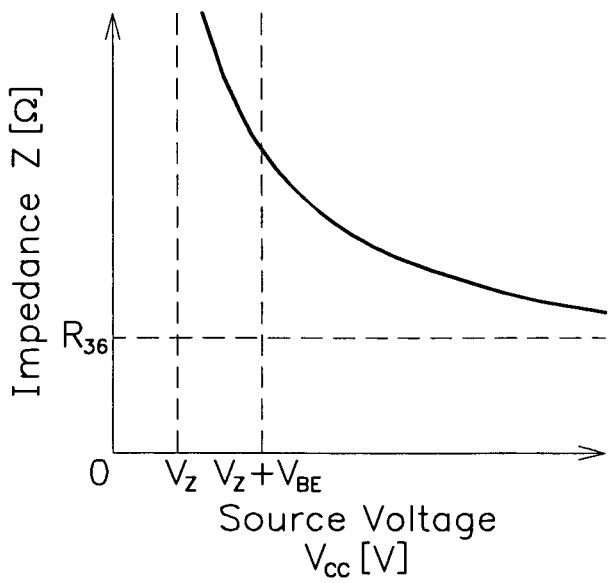

Next, impedance control circuit 31 shown in FIG. 5 comprises, as understood from FIG. 5(A), a series circuit of a first resistor 34, a Zener diode 35 and a third resistor 38 connected between an input terminal of power source voltage $V_{CC}$ on primary control circuit 12 and ground; a transistor 37 having a collector terminal connected to input terminal of power source voltage $V_{CC}$ on primary control circuit 12, a base terminal connected to a junction of a cathode terminal of Zener diode 35 and third resistor 38 and an emitter terminal; and a second resistor 36 connected between emitter terminal of transistor 37 and ground. Here, assuming that symbols $V_{BE}$, $V_Z$ and $R_{36}$ denote respectively voltage between base and emitter terminals of transistor 37, breakdown voltage of Zener diode and resistance of resistor 36, impedance control circuit 31 indicates the impedance property shown in FIG. 5(B) with variation in power source voltage $V_{CC}$ applied on primary control circuit 12. As understood from FIG. 5(B), when power source voltage $V_{CC}$ on primary control circuit 12 increases over breakdown voltage $V_Z$ of Zener diode 35, electric current begins flowing through Zener diode 35, however, electric current hardly flows through base and emitter terminals so that power input impedance Z between both ends of impedance control circuit 31 is expressed as a sum total of all impedances of first resistor 34, Zener diode 35 and third resistor 38. Also, when power source voltage $V_{CC}$ exceeds the sum ($V_Z+V_{BE}$) of breakdown voltage $V_Z$ of Zener diode 35 and base-emitter voltage $V_{BE}$ of transistor 37, a part of electric current passing through Zener diode 35 shunts into base and emitter terminals of transistor 37 to turn transistor 37 on. Accordingly, electric current runs through transistor 37 and second resistor 36 to elevate emitter voltage of transistor 37 connected to second resistor 36, thereby reducing base-emitter voltage $V_{BE}$ of transistor 37. In this way, as graphed in FIG. 5(B), beyond the sum ($V_Z+V_{BE}$), power input impedance Z between both ends of impedance control circuit 31 is gradually lowered and converged toward resistance $R_{36}$ of second resistor 36 with increase in power source voltage $V_{CC}$. Accordingly, impedance control circuit 31 shown in FIG. 5(A) is more beneficial than either of impedance control circuits 31 shown in FIGS. 3(A) and 4(A) because gradually decreasing property of power input impedance Z with increasing power source voltage $V_{CC}$ can be utilized in fine adjustment of input impedance in primary control circuit 12 relative to power source voltage $V_{CC}$.

In a further embodiment of the invention, potential detector 32 may comprise dividing resistors for parting power source voltage $V_{CC}$; a normal power supply for generating a reference voltage; and a comparator for comparing voltage at a junction of dividing resistors and reference voltage to produce an output signal when voltage at the junction exceeds reference voltage, and impedance adjuster 33 may comprise a switching element which is turned on by means of output signal from comparator; and an impedance element such as a resistor. Impedance control circuit 31 shown in FIG. 2 may comprise these potential detector 32 and impedance adjuster 33. Also, switch 46 used in the foregoing embodiments may comprise any of semiconductor switching elements such as MOS-FET (metal oxide semiconductor field-effect transistor), J-FET (junction field effect transistor), IGBT (insulated gate bipolar transistor) and bipolar transistor, etc. Also, in lieu of RSFF 45 and switch 46 in FIG. 1, retention circuit and supply controller may be comprised of switching elements which include a plurality of MOS-FETs and junction transistors. In addition, it would naturally be understood to ordinary skilled that the present invention should not be limited to a flyback type DC-DC converter, but are also applicable to DC-DC converters of other types such as forward, bridge or push-pull types.

According to the present invention, upon occurrence of surge voltage, input impedance at a power source terminal of primary control circuit 12 is lowered but not below a predetermined voltage level to control precipitous elevation of source power voltage on primary control circuit. Also, malfunction of protective circuit due to surge voltage can be prevented by precisely detecting, in the primary side, overvoltage on primary control circuit resulted from any circuit trouble. In addition, operation of control circuit is ceased after detection of overvoltage to minimize power loss incurred and heat generated during the period of time for protecting DC- DC converter and control circuit against overvoltage, and therefore, a single substrate of a semiconductor device can concurrently support a plurality of circuits inclusive for example of a switching control circuit, impedance control circuit, excessive voltage protection circuit, etc., densely mounted on the substrate. In this way, the present invention can acquire an inexpensive and reliable DC-DC converter of wholly simplified structure in circuit and reduced size. The present invention can effectively be applied to DC power source devices such as DC-DC converters for overvoltage protection or AC power source devices such as inverter devices.

What is claimed are:

1. A DC-DC converter comprising a primary winding of a transformer and at least one switching element connected in series to a DC power source; a main rectifying smoother connected to a secondary winding or said primary winding of said transformer; a primary control circuit for producing drive signals to turn said switching element on and off to produce DC output of a controlled given level through said main rectifying smoother; and a drive winding provided in said transformer for providing drive power for said primary control circuit through an auxiliary rectifying smoother connected between said drive winding and primary control circuit;

wherein said primary control circuit comprises an impedance controller and a protective circuit for ceasing operation of said primary control circuit when a power source voltage on said primary control circuit exceeds a predetermined voltage level; and said impedance controller comprises:

a potential detector for picking out the power source voltage to said primary control circuit to produce a detection signal;

an impedance adjuster for adjusting power input impedance in said primary control circuit in response to the detection signal from said potential detector;

a first resistor having one end connected to a power source input terminal of said primary control circuit;

a constant-voltage element having one end connected to the other end of said first resistor;

a second resistor having one end connected between the other end of first resistor and one end of said constant-voltage element; and a switching element having a first main terminal connected to the other end of said second resistor, a second main terminal connected to a ground, and a control terminal connected to the other end of said constant-voltage element.

2. The DC-DC converter of claim 1, wherein said constant-voltage element is connected in series to said first resistor of a predetermined impedance value and has breakdown when the power source voltage on said primary control circuit exceeds a predetermined voltage level.

3. The DC-DC converter of claim 1 or 2, wherein said protective circuit ceases supply of the power source voltage to said primary control circuit when output voltage from said auxiliary rectifying smoother exceeds a predetermined voltage level.

4. The DC-DC converter of claim 3, wherein said protective circuit comprises a comparator for comparing the power source voltage from said auxiliary rectifying smoother with a reference voltage to produce an output signal when the power source voltage from said auxiliary rectifying smoother exceeds the reference voltage;

a retention circuit for maintaining voltage level of output signal from said comparator until the power source voltage from said auxiliary rectifying smoother decreases below a level of the retained voltage; and a supply controller activated by the output signal through said retention circuit from said comparator for ceasing supply of the power source voltage to said primary control circuit.

5. The DC-DC converter of claim 4, wherein said supply controller is kept off until a main power switch is turned off after a detection of excessive voltage on said primary control circuit.

6. The DC-DC converter of claim 1, wherein said primary control circuit, impedance controller and protective circuit are formed on a substrate plate of a same semiconductor device.

7. The DC-DC converter of claim 1, comprising a power-on-reset circuit for generating a reset signal on a start-up of said primary control circuit.

8. A DC-DC converter comprising a primary winding of a transformer and at least one switching element connected in series to a DC power source; a main rectifying smoother connected to a secondary winding or said primary winding of said transformer; a primary control circuit for producing drive signals to turn said switching element on and off to produce DC output of a controlled given level through said main rectifying smoother; and a drive winding provided in said transformer for providing drive power for said primary control circuit through an auxiliary rectifying smoother connected between said drive winding and primary control circuit;

wherein said primary control circuit comprises an impedance controller and a protective circuit for ceasing operation of said primary control circuit when a power source voltage on said primary control circuit exceeds a predetermined voltage level; and said impedance controller comprises:

a potential detector for picking out the power source voltage to said primary control circuit to produce a detection signal;

an impedance adjuster for adjusting power input impedance in said primary control circuit in response to the detection signal from said potential detector;

a first resistor having one end connected to a power source input terminal of said primary control circuit;

a second resistor having one end connected to a ground;

a constant-voltage element having one end connected to the other end of said first resistor;

a third resistor connected between the other end of said constant-voltage element and said ground; and a switching element having a first main terminal connected to said power source input terminal of said primary control circuit, a second main terminal connected to the other end of said second resistor, and a control terminal connected between the other end of said constant-voltage element and said third resistor.

9. The DC-DC converter of claim 8, wherein said constant-voltage element is connected in series to said first resistor of a predetermined impedance value and has breakdown when the power source voltage on said primary control circuit exceeds a predetermined voltage level.

10. The DC-DC converter of claim 8 or 9, wherein said protective circuit ceases supply of the power source voltage to said primary control circuit when output voltage from said auxiliary rectifying smoother exceeds a predetermined voltage level.

11. The DC-DC converter of claim 10, wherein said protective circuit comprises a comparator for comparing the power source voltage from said auxiliary rectifying smoother with a reference voltage to produce an output signal when the power source voltage from said auxiliary rectifying smoother exceeds the reference voltage;
- a retention circuit for maintaining voltage level of output signal from said comparator until the power source voltage from said auxiliary rectifying smoother decreases below a level of the retained voltage; and
- a supply controller activated by the output signal through said retention circuit from said comparator for ceasing supply of the power source voltage to said primary control circuit.

12. The DC-DC converter of claim 11, wherein said supply controller is kept off until a main power switch is turned off after a detection of excessive voltage on said primary control circuit.

13. The DC-DC converter of claim 8, wherein said primary control circuit, impedance controller and protective circuit are formed on a substrate plate of a same semiconductor device.

14. The DC-DC converter of claim 8, comprising a power-on-reset circuit for generating a reset signal on a start-up of said primary control circuit.

* * * * *

UNITED STATES PATENT AND TRADEMARK OFFICE
CERTIFICATE OF CORRECTION

| | | |
|---|---|---|
| PATENT NO. | : 7,633,776 B2 | Page 1 of 1 |
| APPLICATION NO. | : 11/638086 | |
| DATED | : December 15, 2009 | |
| INVENTOR(S) | : Hiroshi Usui | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 266 days.

Signed and Sealed this

Twenty-first Day of December, 2010

David J. Kappos
*Director of the United States Patent and Trademark Office*